United States Patent [19]

Woods et al.

[11] 4,074,353

[45] Feb. 14, 1978

[54] TRAP MECHANISM FOR A DATA PROCESSING SYSTEM

[75] Inventors: William E. Woods, Natick; Philip E. Stanley, Westboro; Kenneth J. Izbicki, Hudson; Steven C. Ramsdell, Lowell, all of Mass.

[73] Assignee: Honeywell Information Systems Inc., Waltham, Mass.

[21] Appl. No.: 689,014

[22] Filed: May 24, 1976

[51] Int. Cl.² .......................... G06F 9/20; G06F 11/00
[52] U.S. Cl. .................................................... 364/200
[58] Field of Search ................................. 340/172.5; 445/1; 444/1; 364/200, 900, 300

[56] References Cited

U.S. PATENT DOCUMENTS

| | | | |
|---|---|---|---|
| 3,562,717 | 2/1971 | Harmon et al. | 340/172.5 |
| 3,614,740 | 10/1971 | Delagi et al. | 340/172.5 |
| 3,639,911 | 2/1972 | Frieband et al. | 340/172.5 |
| 3,771,136 | 11/1973 | Heneghan et al. | 340/172.5 |
| 3,771,146 | 11/1973 | Cotton et al. | 340/172.5 |
| 3,858,182 | 12/1974 | Delagi et al. | 340/172.5 |
| 3,878,513 | 4/1975 | Werner | 340/172.5 |
| 3,900,834 | 8/1975 | Casey et al. | 340/172.5 |

*Primary Examiner*—Mark E. Nusbaum
*Attorney, Agent, or Firm*—John S. Solakian; Nicholas Prasinos; Ronald T. Reiling

[57] ABSTRACT

A plurality of trap save areas are linked to form a pool of such areas from which an area may be loaded with context from various sources in response to a trap condition, such as the addressing of unuseable memory, the loaded area unlinked from the pool, and various pointers changed to reflect such unlinking. The unlinked area is associated with the process which was executing at the time of the occurrence of the trap condition by effectively being coupled to the interrupt level of such process. Independent of the interrupt level, a trap handler routine, specific to the nature of the trap condition, is executed following which the unlinked area is returned to the pool and the various pointers changed to reflect such return.

13 Claims, 9 Drawing Figures

| 0 | 3 | 4 | 7 | 8 | 12 | 13 | 15 | 16 | 17 | 23 | 24 | 25 | 26 | 31 | 32 | 35 | 36 | 39 | 40 | 45 | 46 | 55 |
|---|---|---|---|---|---|---|---|---|---|---|---|---|---|---|---|---|---|---|---|---|---|---|
| LS | | RS | | AF | | AM | | AFC | GC | | SM | | BI | | BS | | BR | | TC | | NA | |

TRAP MECHANISM FOR A DATA PROCESSING SYSTEM

RELATED APPLICATIONS

The following applications are incorporated by reference to the instant application:
1. "Interrupt Scan and Processing System for a Data Processing System", invented by William E. Woods and Philip E. Stanley, having Ser. No. 591,905, now U.S. Pat. No. 4,020,471, and filed on June 30, 1975; and
2. "Architecture for a Common Bus Coupled in a Data Processing System", invented by Frank V. Cassarino, Jr. et al., having Ser. No. 591,964, now U.S. Pat. No. 3,993,981, and filed on June 30, 1975.

BACKGROUND OF THE INVENTION

The present invention relates generally to data processing systems and more particularly to data processing systems having so-called interrupt and trap processing capabilities.

Many if not all computers now in use have trap and interrupt structures, various implementations of which were originally designed as much as 10 to 15 years ago. In some respects, due to the expensive logic and nonexistent microprogramming, the various designs thereof did not include the expanded functionality which is expected in today's computer systems. It is important to have flexible and expanded functionality in order to enable the integration of such interrupt and trap mechanisms in a manner which simplifies the programming of a computer and which improves system performance. Some such functionalities in the interrupt structure include the areas of scheduling, arbitration, and termination which has hitherto been relegated to software. In the trap mechanism, special provisions for passing of parameters and work space is also a desired functionality.

It is important to distinguish between traps and interrupts particularly by their functionalities. Traps are breaks which result directly from the execution of instructions in the computer system. Frequently known as internal or synchronous interrupts, traps exist to deal with process-specific conditions such as register overflow, use of an unimplemented instruction, or reference to uninstalled memory. Trap service routines are agents of the currently active process, and upon completion will either return control to that process at the point at which invoked, or suspend that process and return control to the system. Interrupts and more particularly external interrupts, i.e., interrupts received from a device, coupled for service by the data processor, and invoked by conditions unrelated to the current process, such as external events or devices requiring service or by permanent changes in the status of the current process relative to other processes or to external interrupts, such as suspension of the current process upon completion of its task, or changing the priority level of the current process. Traps differ significantly from interrupts in the nature and amount of context saved before entering a trap handling procedure.

It is desirable in a trap mechanism, in response to a trap condition, i.e., addressing of uninstalled memory, to enter a sequence designed to handle the condition automatically, without the need for time consuming tests each time such a trap condition arises. This permits the writing of more efficient computer programs by removing the need for many in line tests. It also permits the running or execution of a program on a system not having certain central processor options used by the program, since the trap handling routine may be provided to simulate the option. This enhances the system integrity by detecting many program error conditions. It is accordingly important, upon the detection of a trap condition, to immediately respond to the trap condition and perform in as efficient a manner as possible, a partial context save of the running program in predefined memory areas. It is also necessary to expeditiously store such information describing the cause of the trap condition and transfer control to a suitable response program. In order to minimize the amount of memory area which is needed, and in order to efficiently associate such memory areas having the stored context in association with the priority or interrupt level of the running process, it is important to provide flexibility with respect to the use of such predefined memory areas.

It is accordingly a primary object of the present invention to provide a data processing system having an improved trap structure for use in efficiently servicing various conditions caused directly or indirectly by a process which may be executing in a data processing system.

SUMMARY OF THE INVENTION

The above-stated object and other objects are achieved according to the present invention by providing a data processing system which includes a plurality of trap save areas, each of such areas including a plurality of locations for storing information. Apparatus is also provided for linking the plurality of trap save areas to each other to form a pool of such areas. Such apparatus for linking includes a pointer in each of such areas for pointing to another of such areas so that a first area points to a second area and so that such second area points to a third area and so on until an area points to a last of such areas. Additionally, a pointer is provided for pointing to the first such area in the pool of such areas. Apparatus is also provided for indicating the interrupt level, one of a plurality of interrupt levels, of any device which may be coupled with the system and which device requires processing to be provided by such system. The interrupt levels indicate priorities in such a manner that an interrupt level of a first priority will have precedence in such system for processing over an interrupt level of a second priority. Further, in response to a predetermined condition, apparatus is provided for loading such locations in the first trap save area with information from predetermined sources included in the system. Also in response to such predetermined condition is provided apparatus for unlinking the first such area from such pool of trap save areas. Apparatus is further provided for linking the unlinked first such area with the process associated with the one of the interrupt levels having such precedence when such predetermined condition occurred.

BRIEF DESCRIPTION OF THE DRAWINGS

The above and other objects of the present invention are achieved in the illustrative embodiment as described with respect to the Figures in which:

FIG. 6 is a general block diagram illustrating the various structures included in the system of the present invention;

DETAILED DESCRIPTION OF THE PREFERRED EMBODIMENTS

Figure 1:
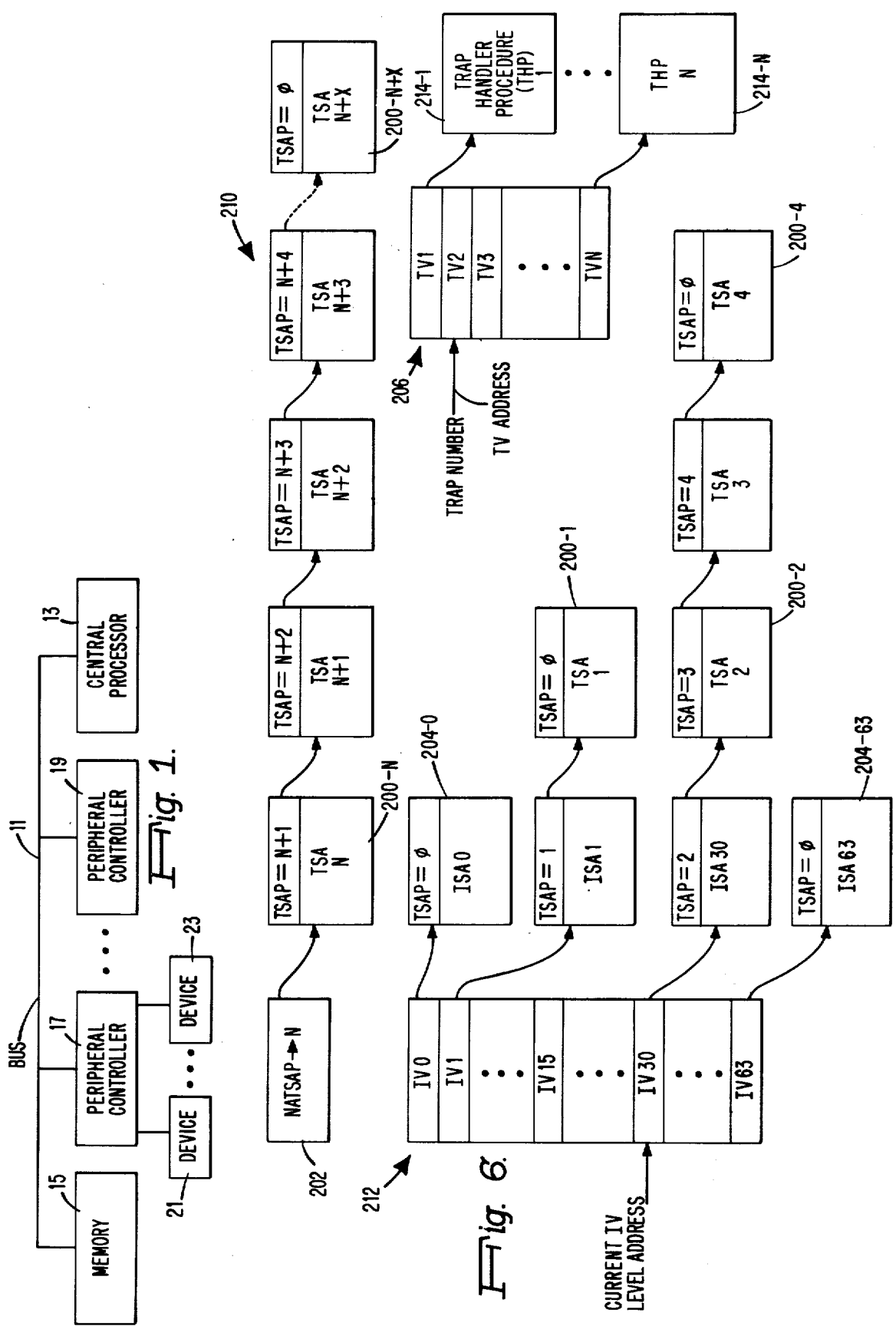
FIG. 1 illustrates the environment in which the present invention is included.

The trap mechanism of the present invention is included in that environment as generally shown in FIG. 1. The common or external bus 11 is coupled with a central processor 13 at one end and at least one memory device 15 at the other end of the bus 11. Also coupled on the bus may be various peripheral controllers such as those used for controlling a tape or disc storage device, communications devices, options such as scientific and arithmetic units, and other peripheral units such as card readers. Such peripheral controllers are shown generally as controllers 17 and 19, each such controller coupled to interface at least one peripheral device. Controller 17 is shown by way of example coupled to control two peripheral devices 21 and 23.

Figure 2:
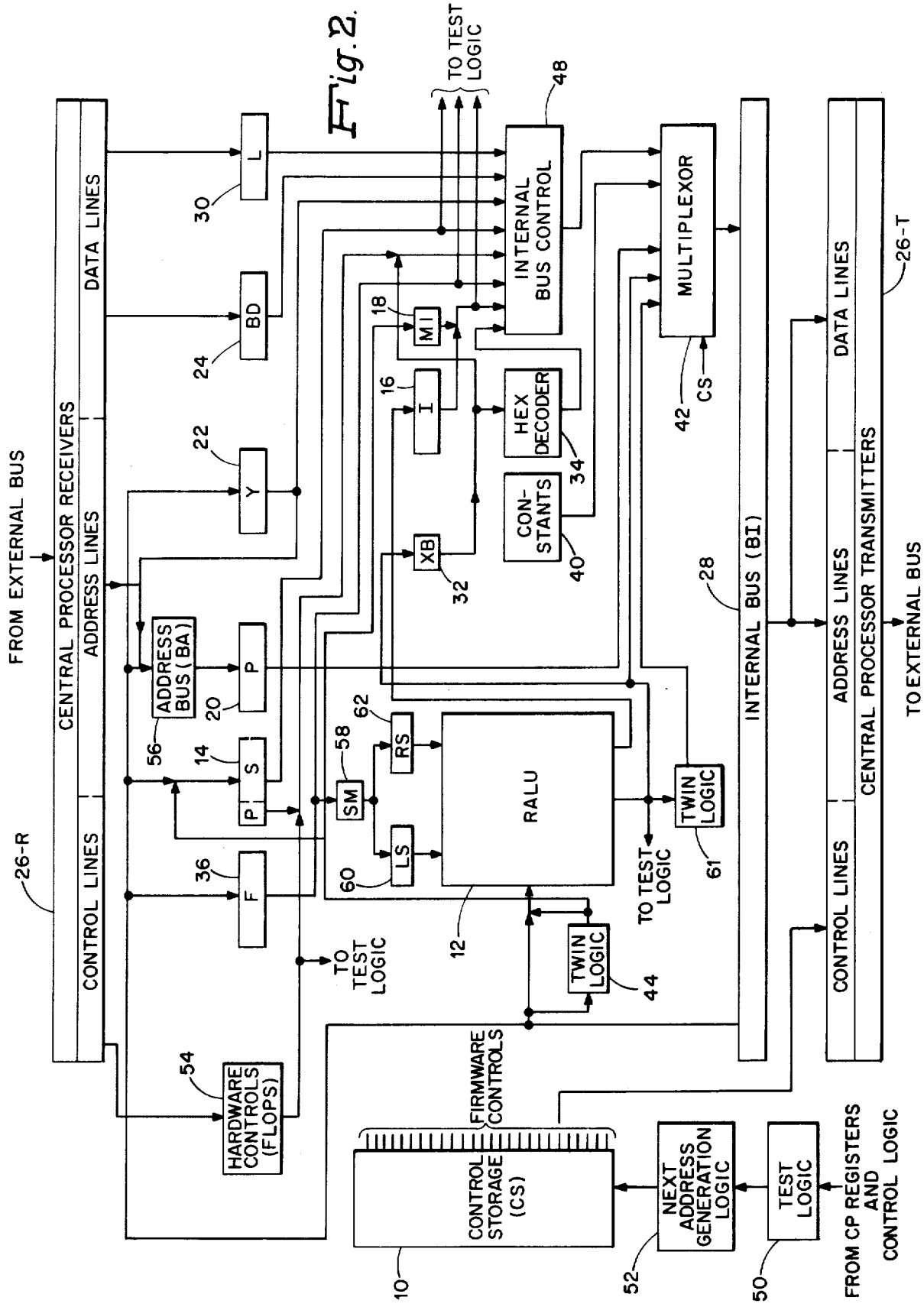
FIG. 2 illustrates a general block diagram of the data processor in which the present invention is included.

The trap mechanism of the present invention is included in the data processor 13, a block diagram of which is shown in FIG. 2. The central data processor of the system of the present invention includes a control store 10 which includes by way of example 512 locations, each location including 56 bits. Each such location is capable of storing a firmware word, such firmware words being used to control various hardware operations within the data processor. It is understood that the number of such locations and/or firmware words and the number of bits in such words may be increased or decreased without departing from the scope of the present invention. Operation of a control store and the instruction decoding thereof is shown in the article entitled, "Designing Optimized Microprogrammed Control Sections for Microprocessors", by G. W. Schultz, appearing at page 119 of the April, 1974 issue of Computer Design magazine.

Figure 3:
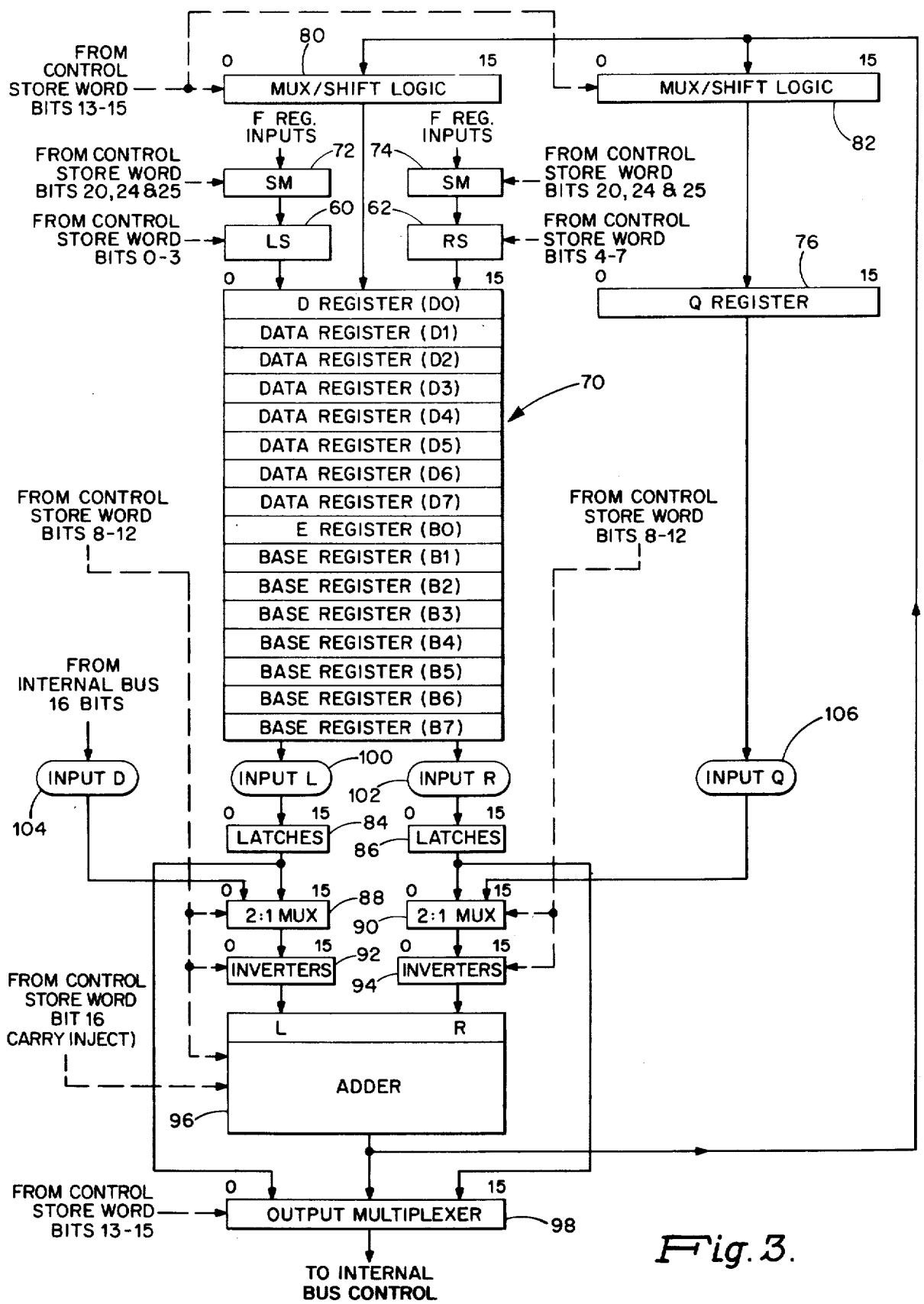
FIG. 3 provides a general block diagram of the micro-processor logic used in the data processor shown in FIG. 2.

Also included in the data processor is a register and logic unit (RALU) 12 which is sometimes referred to as the microprocessor. FIG. 3 is a block diagram of the RALU 12 illustrating the details thereof. In general, the RALU is divided into four areas which include a register file, shift logic, arithmetic logic, and control logic. The register file includes data registers, working registers and base registers. The shift logic is used during shift operations and normal transfers of data. The arithmetic logic includes various latches or buffers, multiplexors, inverters and an adder unit. The control logic of the RALU includes selector logic for selecting that portion of data to be operated upon.

The central processor of the present invention includes various registers some of which are not essential to the present invention but which will be generally discussed for background purposes. The status/security register 14 contains the system status and security keys. This register includes bit fields which indicate whether or not the system is in the privileged state (P) or whether it is in the user state. During the user state, specified instructions will enter a so-called trap routine instead of being executed. The register 14 also includes a field for indicating the i.d. number of the processor set during system configuration. The register 14 also includes a field for indicating the interrupt priority level of the central processor. All devices requesting interrupts in the system specify an interrupt level. The current running program in the central processor will be interrupted if the device specifies a level number which is lower than the actual level number of the running program wherein the lowest level number indicates a process and/or device which is least interruptable. Such interrupt structure is shown in application Ser. No. 591,966, filed June 30, 1975.

The indicator register (I) 16 contains the overflow and program status indicators. This register 16 also includes various fields among which are included fields for indicating the results of any comparison which was made in the system, and indication or status of the last peripheral device which was interrogated, and a field to indicate the state of the last bit tested.

The M1 register 18 contains trap enable mode control keys, which include a field for enabling a trace trap (i.e., a trap which assists in tracing a computer program's operation) for jump and branch instructions.

The program counter (P register) 20 is by way of example a 16 bit register which normally contains the address of the instruction currently being executed. The Y register 22, i.e., the memory address register, is also by way of example a 16 bit register that normally contains the address of data to be accessed in memory. The bus data register (BD) 24 is also by way of example a 16 bit register that receives bus data from the receiver logic 26-R for distribution throughout the processor via the internal bus 28. The interrupt register (L) 30 is also by way of example a 16 bit register that receives a channel number and level of an interrupting device via the receiver logic 26-R.

The XB register 32 is by way of example a four bit register that is used for bit and byte indexing within the processor. The output of this register 32 is coupled to both the internal bus 28 and the decoder logic 34. The instruction register (F) 36 is by way of example a 16 bit register that holds the instruction word as it is received from a memory which may be coupled to the external bus.

The constant generator logic 40 is coupled to provide specific constants via multiplexor 42 to the internal bus 28. Logic 34 includes a four to 16 bit decoder that is used to generate a mask for bit operations. That is, one out of 16 bits is selected for testing and/or modification for use by the firmware included in control store 10. The input twin logic 44 provides the capability of either duplicating the most significant (left hand) character (byte) or performing a straight through transfer from the internal bus 28 to the RALU 12. Output twin logic 61 provides similar capabilities.

The internal bus control logic 48 utilizes bits 26 through 31 of the firmware word in control store 10 to gate the contents of selected processor registers onto the internal bus 28 via the multiplexor logic 42. Certain gate elements of logic 48 are illustrated in application Ser. No. 591,964, filed on June 30, 1975. Multiplexor logic 42 includes the logic by which data is transmitted to the internal bus 28, with only one input enabled for transfer at any given time.

Test logic 50 selects by way of example one of 64 possible test conditions, using control store bits 40 through 45. Depending upon whether the tested condition is true or false, a true or false signal is transmitted to the next address generation logic 52. The processor utilizes one of two methods to generate the next firmware address. The first method uses bits 46 through 55 of the control store word to form the next address. These bits may for example comprise a 10 bit address field (next address, NA) that can directly address one of potentially 1,024 control store locations. The second method obtains the next address from logic circuitry that contains several preassigned addresses. The address selected is determined basically by a decode of the F register 36 contents and the control store 10 outputs.

The internal bus (BI) 28 is by way of example 16 bits wide and is primarily used to transfer data between the processor's registers. Memory addresses and data are also transferred to the external bus via the internal bus 28. The address bus register 56 is by way of example 16 bits wide and is used to transfer the addresses for the input and output and memory read or write cycles to the logic 26-R and T. The transceiver logic 26 (26R and 26T) include logic circuitry which are the only interface between the central processor and the external bus. All data, address and interrupt signals must pass through the transceiver logic 26. Such transceiver logic 26 as well as the operation of the external bus is described in application Ser. No. 591,964, filed on June 30, 1975.

The select modifier logic (SM) 58 determines which bits of the F register (if any) are used to modify the register file selection performed by the LS and RS fields, i.e., the left select and right select fields of the control store word of control store 10. The SM logic 58 gates F register bits 1 through 3, 10 through 11, and 13 through 15 or 12 through 15 depending upon the configuration of control store bits 20, 24 and 25 to both the left and right selector logic, i.e. LS logic 60 and RS logic 62. The LS and RS logic uses the selector modifier 58 output and the contents of control store bits 0 through 3 or 4 through 7 for register selection. Control store bits 0 through 3 are used by the left selector. Control store bits 4 through 7 are used by the right selector.

The external bus provides a common communication path or interface among all units, including memory, of the system as shown in application Ser. No. 591,964, filed on June 30, 1975. The external bus is asynchronous in design and units of varying speed are operated efficiently on the system with three types of communication permitted, namely, memory transfers, input/output transfers, and interrupts. The external bus may have coupled thereto, the central processor, a memory unit, peripheral device controllers, communications controllers and the like. The above noted registers, etc. are further described in a Honeywell Information Systems Inc. publication dated January, 1976, entitled, "Honeywell Level 6 Minicomputer Handbook", order number AS22.

Now referring to FIG. 3, the register and logic unit (RALU) 12 is illustrated in detail. RALU 12 may comprise four model 6701 microcontrollers manufactured by Monolithic Memories Inc. and described in their publication therefor dated August, 1974. As indicated hereinbefore, the RALU 12 is divided into four basic areas, more particularly a register file, shift logic, arithmetic logic, and control logic. First referring to the register file 70, it includes the data registers D1 through D7, the working registers D0 (or D) and E, and base registers B1 through B7. Registers D1 through D7 are by way of example 16 bit word operand registers, with bit zero being considered the most significant bit. Registers D and E are also by way of example 16 bit registers and are used for manipulating data during firmware operations, the register D is used to hold a copy of the contents of the instruction register (F) 36. The base registers are also by way of example 16 bit address registers that can be used for formulating addresses by pointing to any procedure, data or arbitrary location in the system. The base registers also have an auto increment and auto decrement capability to allow easy use of these registers for stacks, queues and program loop operation.

Multiplexer shift logic 80 and 82 primarily include two 16 bit multiplexers that are used for both shift operations and normal transfers of data. An additional 16 bit register (Q) 76 is provided for double operand shifts. Data can be shifted left or right by one bit between the multiplexers and any data register within the register file 70. In the present invention, Q register 76 normally includes an unindexed address and the E register (B0) includes an index value.

The arithmetic logic is comprised of two 16 bit latch circuits 84 and 86, two two-to-one multiplexers 88 and 90, two 16 bit inverters 92 and 94, adder unit 96 and an output multiplexer 98. The latches associated with input L 100 receive data from the register file 70 as selected by the left selector logic 60. Similarly, the latches associated within input R 102 receive data from the register file 70 as selected by the right selector logic 62. Outputs from these latches feed both the two to one multiplexers 88 and 90 respectively and the output multiplexer 98. The left-hand multiplexer 88 receives data from the internal bus 28 via input D 104 as well as from the latches 84 associated with input L 100. The right-hand multiplexer 90 receives data from the Q register 76 via input Q 106 as well as from the latches 86 associated with input R 102. The outputs from these multiplexers are fed through inverters 92 and 94 respectively to the respective L and R inputs of the adder unit 96. The adder unit 96 provides all arithmetic operations. In addition to the L and R inputs, an additional input is provided from control store word bit 16 (carry inject). The adder 96 output is fed to both the output multiplexer 98 and the input multiplexers/shift logic 80 and 82. The output multiplexer 98 is the main output from the RALU 12. Data from the output multiplexer 98 is provided to the internal bus 28 for distribution throughout the processor.

The following is a further discussion with respect to the processor and operation that is depicted in FIGS. 2 and 3. The central processor is organized around a single internal bus 28 which connects most of the processor logic to each other and to the external bus via receivers 26-R and transmitters 26-T. As indicated hereinbefore, the Y register 22 is the memory address register and the F register 36 is utilized to receive an instruction word during instruction fetches. The various bits on the internal bus 28 are used as inputs to the test logic 50 for use in making firmware branching decisions. The information contained in such various bits from the internal bus 28 can be stored in the various hardware control flip-flops 54. The internal bus 28 is also an input to the RALU 12.

The internal bus 28 is driven or controlled by several elements which operate under firmware control, including the constant generator 40, the RALU 12, and the byte selection register (XB) 32 which is loaded by a shifting from the RALU 12.

The current instruction is dynamically available at the output of the control store 10 and is partially decoded with various logical elements and is then used to provide operations with respect to the remaining elements in the system. The next address generator logic 52 utilizes the next address field in the control store word, i.e. the firmware word and generates a new address dependent thereon and dependent upon test conditions provided by test logic 50. The control store 10 advances to the next address once per processor clock cycle which may be in the order of a few hundred nanoseconds.

Branching in the firmware, i.e. the control store is detected by the test logic 50, which uses the contents of the internal status flip-flops 54, the state of the internal bus 28, and the contents of the F register 36 to decide whether any test condition is satisfied or not. This test condition is an input to the next address generator logic as indicated hereinbefore. This test condition also is utilized to select two forms of address generation during various types of branching operations. The XA branch which selects among the entry points in the firmware for the various types of address formation makes a decision based largely upon the contents of the F register 36. The XR branch concerned with fetching operands from memory has its entry points decided to a large extent by the opcode field of the F register 36. By way of further example, the XE branch is based almost exclusively upon the opcode of the instruction and is enabled by the opcode bits of the F register 36. The XW branch which is the branch which decides the manner in which the operand is written back into the memory is performed on the basis of the opcode type and upon the internal status flip-flops 54.

As previously indicated, the input to the RALU 12 and the output thereof both have networks which can twin the data input and output to and from the internal bus 28. Using the input twin logic 44, one can either transfer in the 16 bits from the internal bus 28 directly to the RALU 12 or in the alternative, the 8 left hand or most significant bits can be duplicated on both byte positions of a word in the RALU 12. Similarly, there is a twin network 61 on the output of the RALU 12 that will enable the internal bus 28 to be driven from both sides or halves of the RALU output. The right half of the RALU output i.e. the least significant bits may be duplicated on both byte positions of the word as it is transferred to the internal bus 28.

Shifting of the index registers is provided for certain types of addressing and is accomplished by shifting the index value stored in the index register, usually the E register, of the register file 70. During indexing, bits are shifted out either left or right depending on the operation.

The control flip-flops, i.e. the hardware flip-flops 54 which for purposes of describing the present invention need not be shown in detail, include several flip-flops. One is used to keep track of whether or not the instruction currently being executed is a memory reference instruction or not. Another is used to store the fact of whether or not the output of the RALU 12 was a zero at some previous time.

The F register 36 is actually a 12 bit static register and a 4 bit dynamic counter. The four right hand bits of the F register, i.e. bits 12 through 15 are used as a counter which can be counted down toward zero and whose contents can be tested for use by the next address generation logic. This is used to count shifts, i.e. this is part of the F register 36 which is loaded with the shift distance when a shift is being executed. It is also used for the loops which save and restore the registers in memory to count successively through the 16 registers in the register file 70.

The test logic 50 includes a plurality of selectors enabled by various control store and opcode conditions and generally performs those tests which are used for making decisions during firmware execution.

Logic 80 and 82 are that portion of the RALU 12 which can either provide i.e. transfer the output of the adder 96 into register file 70 or into O register 76, or provide the output of the adder 96 shifted one bit to the left or shifted one bit to the right. The logic 80 is coupled directly into the registers in register file 70. If the input to register file 70 is shifted either one bit to the right or one bit to the left, then the appropriate shift input will be provided from the control logic to supply the missing bit, and the other bit will be transferred out. The E register included in register file 70 is that register which may maintain the index values.

Figures 4, 5:
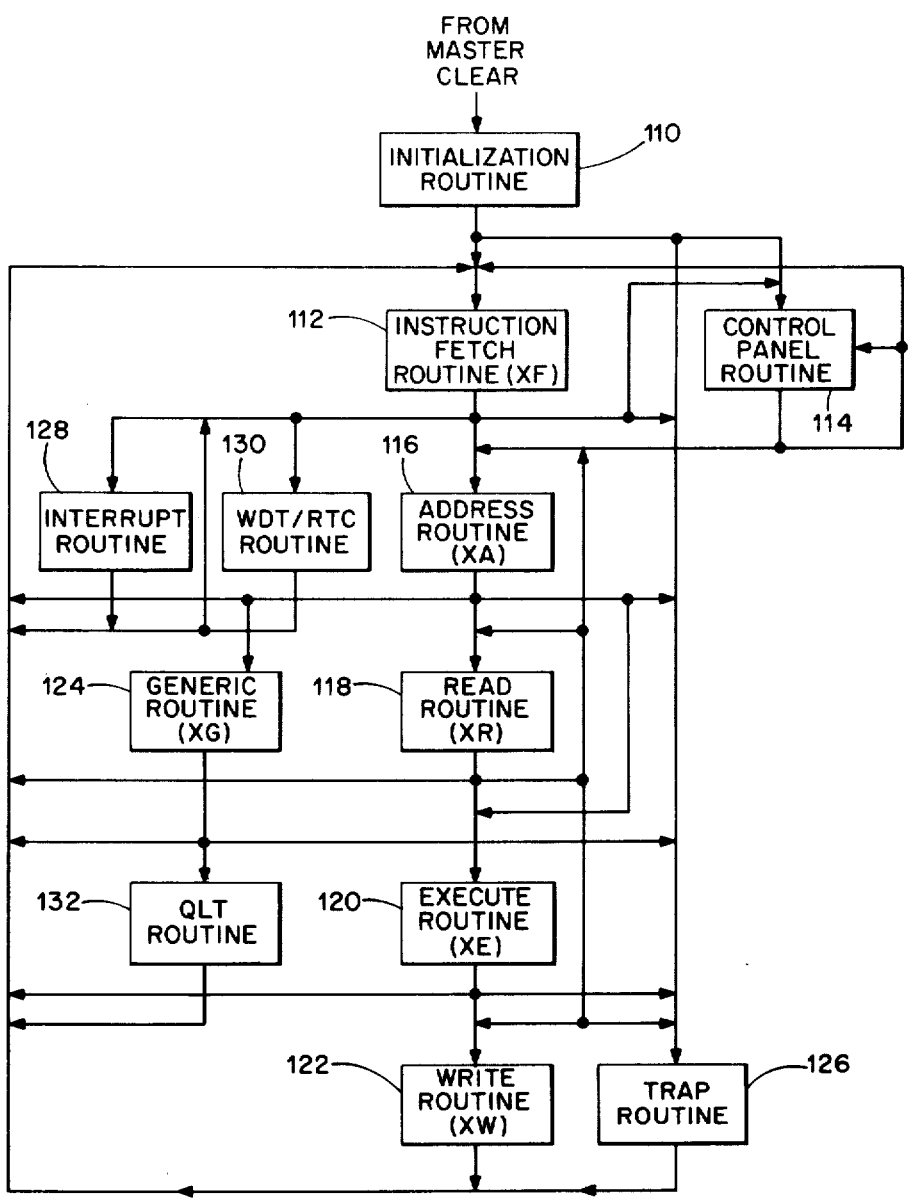
FIG. 4 illustrates in general block diagram form, the firmware routines provided in a control store included in the data processor of FIG. 2.
FIG. 5 illustrates the manner in which the firmware word included in such control store is configured.

Left selector logic 60, right selector logic 62 and the selector modifier logic 58, which includes logic 72 and 74, also comprise part of the control logic of the RALU 12. The output of the selector modifier 58 along with the control store bits zero through 7, determines the output of the left and right selectors 60 and 62, respectively. Control store bits 8 through 15 control the following areas of the RALU 12 logic: Bits 8 through 12 control the adder unit 96 plus the multiplexers and inverters 88, 90, 92 and 94; and bits 13 through 15 control the input and output multiplexers 80, 82 and 98. As indicated hereinbefore, the control store 10 is comprised of a plurality of firmware words for use in controlling various operations within the processor. FIG. 4 provides an overview flow diagram of such firmware and shows all major branches between the major firmware routines. The following is a general description thereof. More specific details of such firmware with respect to the present invention are provided hereinafter.

The initialization routine 110 is entered following a master clear of the system. This routine clears various ones of the processor registers and flops and determines whether or not the control panel is locked, i.e. whether all control panel switches, etc. are disabled; the control panel being another element which may be included in the processor, but which is not essential to the operation thereof and which is not shown herein. If the control panel is locked, a branch is performed through the instruction fetch routine 112, otherwise the control panel routine 114 is entered. The instruction fetch routine 112 is used to obtain the next instruction for execution. Once the instruction is received from memory, it is loaded into the instruction register (F) 36 and the D register. During the XF routine, checks are performed for the following conditions: (i) recoverable memory error, (ii) watchdog timer or real time clock service required, (iii) device interrupt, or (iv) control panel unlocked. If any of such conditions are encountered, a branch is performed for the appropriate routine; otherwise the address routine 116 is entered.

The address routine 116 is primarily used to decode the so-called address syllable portion of the instruction contained in the F register 36. The decode determines whether the next routine is a read routine, an execute routine or a generic routine as hereinafter described. Some instructions, such as shift, are executed entirely within the address routine 116. After executing these instructions, the XF routine 112 is entered to fetch the next instruction.

The read routine 118 calculates the final effective operand address and selects among the various places from which the operand must be obtained. If necessary, the operand is obtained during this routine. Some instructions are executed within the read routine. The execute routine 120 selects one of several subroutines that are used to complete execution of most central processor instructions. The write routine 122 stores the operand or result after the instruction is executed. This routine is entered only when executing instructions that must return the operands to a location specified by an address syllable after execution. Five entry points are available for the write routine, the particular entry point used being based on whether the operand is to be transferred to memory or a register, whether the operand is an address operand, and whether it is a half or a full word operand. The generic routine 124 is used to execute several instructions that are not executed by the execute routine. Exemplary of such instructions are the halt instruction, the return from trap condition instruction, or those instructions affecting the state of the real time clock or watchdog timer.

The trap routine 126 is entered from any one of many locations within the firmware when a trap condition is detected. The interrupt routine 128 is entered from a number of sources depending upon the operation currently being performed by the processor. Such sources may include for example the following: an interrupt caused by the use of the last trap save area or caused by programmed interrupt or caused by an external device received via the external bus or for example by a power failure. The watchdog timer and real time clock routine 130 is entered every several milliseconds (for example every 8.33 milliseconds) if either the watchdog timer or the real time clock is enabled. Also provided as one of the routines is the quality logic test routine 132 which provides a basic confidence test of the processor logic.

Thus, the six major branches, i.e., the XF, XA, XG, XR, XE, and XW branches are in summary used as follows: the XF branch is used to obtain the next instruction for execution; the XA branch is used when it is necessary to decode the address syllable contained in the F register 36; the XG branch is used when it is necessary to select between individual generic instructions; the XR branch is used to read an operand based on a decode of the F register; the XE branch is used to select among the various subroutines and execute the actual processor instructions; and the XW branch is used when it is necessary to store an operand after execution of the instruction.

The firmware word control format is illustrated in FIG. 5. As can be seen, the firmware word is divided into 12 distinct fields. Each of these fields controls a different portion of the hardware logic as shown in FIGS. 2 and 3 and other figures. The bits comprising the fields are also illustrated in FIG. 5. For example, the LS field consists of bits 0 through 3 of the firmware word. The following is a description of each of such fields, and the general use thereof.

The LS field is used to select one of the 16 registers 70 in the RALU 12. The selection so performed by the LS field is subject to modification by the selector modifier field (SM). The LS field is used only during read operations. The right select field (RS) is used as is the LS field, selecting the same register or another one of the 16 RALU registers 70. The RS field however is used for both read and write operations. The AFC and AF fields are used in combination and provide the necessary decode for controlling all operations within the arithmetic logic unit or adder 96. The AM field controls the output multiplexers 80, 82 and 98 thereby controlling all data movement and shift operations within the RALU 12.

The GC field controls various hardware operations which are classified into three groups. The particular group selected is determined by a decode of bits 17 and 18 of the GC field. The first group controls operations associated with the P register 20, the I register 16, and the F register 36. The second group controls operations associated with the twinning logic, i.e. logic 44, the S register 14, the M1 register 18, the XB register 32, the watchdog timer and the real time clock, and the various hardware control flops 54. The third group is utilized in association with operation of the control panel.

The selector modifier (SM) field in addition to including bits 24 and 25 of the firmware word also utilizes bit 20 thereof which is included in the GC field. If the two SM bits are both equal to zero indicating that they are not used, then the selection performed by the LS and RS fields is not affected. If however the SM bits 24 and 25 are used, i.e. they are not equal to zero, then the specific bits of the F register 36 are logically anded with both the input of the LS and RS fields which are in turn used for register file selection. The internal bus control field (BI) is used to transmit information onto the internal bus. The external bus control field (BS) is utilized to control the central processor's use of the external bus. The branch type field (BR) determines the type of branch performed as a result of a specific test condition. The test condition field (TC) determines the specific test condition that is used in conjunction with the branch type field. The next address field (NA) defines the next sequential firmware word address in control store 10.

Before discussing the specific details of the trap mechanism of the present invention, the interrupt structure with which the trap structure of the present invention is associated will be generally discussed. Detailed discussion and illustrations with respect to the interrupt structure may be found with reference to copending applications Ser. Nos. 591,966 and 591,905 each filed on June 30, 1975.

The interrupt structure which may be utilized in association with the trap structure of the present invention allows interrupts to be received by the central processor 13 from any one of the devices coupled with the bus 11. Accordingly, controller 17 may, for example, generate an interrupt. Such interrupts received from such devices coupled with the bus are referred to as external interrupts. In addition, interrupts may be generated internal to the central processor under computer program control.

The interrupts generated in the system, whether they be external or internal to the processor 13, are generated asynchronously with respect to the operation of the system, including the current computer program being processed in the processor 13. The interrupts may be classified by their source, as previously mentioned as being either external or internal to the processor 13. Externally generated interrupts may be so generated by any one of the following events: that a peripheral device of a unit requires service, that there is a power failure, that there is a time out such as via a watchdog timer or a real time clock indicating for example that an operation has not taken place within a prescribed time. Internally generated interrupts may be generated by a special instruction, i.e. a so-called LEV instruction.

There are various priority level associated with the interrupts in the system. Every computer program in the central processor executes at a priority level defined by a six bit level code. The executing computer program in the processor 13 may be interrupted by an event having a priority level that is "greater" than the level of the currently executing program. A level equal to zero has the highest priority and the higher numbered levels have the lower priority. In a system, several interrupt levels may be utilized such as for example 64 different levels such that levels range from level numbers zero through 63 with level number 63 having the lowest priority. Associated with each level is a corresponding interrupt vector (IV) which is stored in a dedicated memory location. The interrupt vector is a pointer to an interrupt saving area (ISA). When a program executing is interrupted, its context is stored in its corresponding interrupt save area. The context of the interrupting process is retrieved from the interrupt save area of the interrupting level. This interrupting process then starts executing at its assigned level. Different processes or programs may be running at different levels. Further, a process or program may have more than one level associated with it. For example, normally the program may run at one level and when it starts to execute at a point where it does not want to be interrupted, except for example, for a power failure, it may make a level change (to a lower numbered level) so as to be less interruptable. Associated with the 64 different levels may be a register of 64 bits (which may for example be located in memory) in order to indicate what levels are currently active, that is, what levels and accordingly processes are ready for execution. Usually, the level currently executing corresponds to the most significant bit set. These 64 bits are referred to as activity flag bits and are set by the external interrupt requests and are set and/or cleared by the LEV instruction generated internally in the processor 13.

When an external interrupts occurs, the interrupt vector for the interrupted level is extracted and provides access to its interrupt save area, into which are stored the contents of selected registers which may be included in the processor 13. These registers may for example include the program counter and other special registers such as for example commonly used memory registers as well as other general registers. Depending upon the number of such registers, the contents of which must be saved, and assuming by way of example that the number of such registers is no greater than 16, then a 16 bit interrupt save mask register (ISM), which may be contained for example in the interrupt save area, controls the subset of the registers to be saved. The interrupt vector for the interrupting level is used similarly to gain access to its interrupt save area from which the contents for the registers previously saved for it are again loaded back into such registers. The identity of the interrupting channel is stored in a location of its interrupt save area.

If the interrupt vector of the interrupting level contains an invalid address, then the interrupt is not honored. More particularly for example, if the interrupt vector is all zeroes, then this cannot be a proper interrupt vector since by definition the vector must point to the interrupt save area which for example starts at a location other than zero. If the interrupt is honored, a scan of the activity flag bits will be made.

Thus, it can be seen that interrupts are generally not related to the current program and are at least asynchronous with the operation or execution of such current program. Traps are distinguished from interrupts in that they are synchronous and in some sense caused by the currently executing program. Whereas the function of the interrupt structure relates to the actions that the central processor takes when an event of importance to a program takes place generally outside of the processor, the function of the trap mechanism relates to the ability of the processor to handle conditions caused by an executing program (whether it be an illegal instruction, a device option not present, or an attempt to address a nonexistent memory), to enter a program sequence designed to handle the condition automatically without the need for time consuming tests each time any such condition might arise. Further, with respect to the interrupt structure, by providing an adequate number of interrupt levels, this provides a benefit in that is permits the processor to control the prioritized execution of tasks thereby eliminating the need for complex software to perform this function. The benefit of the trap structure is that it permits the writing of more efficient computer programs by removing the need for many in-line tests and permits the running of a program on a system not having certain central processor options used by the program since the trap handling mechanism can simulate the option.

As generally indicated above, a trap from a process, i.e. a deviation from the normal process which would have been executed had a condition, i.e. a trap condition, not occurred, is generally caused by any one of the following events: a trace instruction calling for the debugging of an error condition, a scientific option not in the hardware, an arithmetic capability not included in the hardware, any other capability not included in the hardware, an invalid address, overflow conditions generated by for example the arithmetic unit in the processor, an unprivileged use of a privileged operation, unprivileged reference to a protected area in a memory associated with the processor, reference to unavailable memory space, a memory parity error condition and the like.

When a trap condition occurs, the context associated with the trap is stored in a trap context save area taken from a pool of such areas, after which this area is attached to the context of the current process, and finally a trap handler procedure specific for the type of trap is entered and trap handling begins. A return from trap condition is essentially the reverse of the trap entry procedure, successively reloading context from the trap save area, unlinking the area from the context of the current process, and finally returning this trap save area to the pool of save areas. The trap mechanism of the invention shall now be explained with reference to FIG. 6.

There are four elements which may be implemented by way of data structures in memory 15, which are used by the processor 13 to support the trap functionality. The first of these is the trap context save area (TSA) 200, a plurality of which exist. Each TSA 200 may include by way of example an eight word block in memory into which context is saved at trap entry and from which context is restored during return from trap. The first location in a TSA block 200 is a link which is sometimes referred to as a TSAP, to the next TSA in the linked string of TSAs of which this is a member. If this is the last TSA in such string, then its TSAP will be equal to zero. Thus only the last seven locations are actually used for context save and restore functions. Before generally describing the context which may be saved or restored in such seven locations, it is important to note that there may be, by way of example, 65 such strings of TSAs which may exist, one for each interrupt level of which there may be 64 by way of example, thereby containing context saved by traps currently being handled at each level, and a 65th such string consisting of empty TSAs available for use by future traps, such 65th such string referred to as the TSA pool 210, as hereinafter described.

Such other seven locations may include locations for the context of the I register 16; one of the data registers, for example, data register D3; the first word of the instruction being executed at the time the trap was invoked; and a so-called Z word which includes a collection of system status indicators at the time of trap invocation. Such system status information may include such information as the privilege state of the processor 13 prior to such trap entry, a one bit field indicating whether this was a memory reference instruction, a four bit field indicating the number of words fetched since the beginning of the present instruction, a four bit field indicating which bit or byte in the operand of this instruction is of interest, etc. Also included in such seven locations in the TSA may be the effective address of the operand in memory, the content of the program counter 20, and the contents of one of the base registers, by way of example, base register B3.

The second such element of such four elements is the pool 210 of empty TSAs 200 which are areas available for use by traps which may be associated with any interrupt level or of any trap type. This will consist of the potential 65th string of TSAs mentioned earlier as pointed to by the contents of a dedicated memory location, hereinafter referred to as the next available trap save area pointer, or NATSAP 202.

The third such element is the interrupt context save area, ISA 204, a plurality of which may exist and by way of example may be 64 in number corresponding to the 64 interrupt levels. The first word of each interrupt context save area may be the trap save area pointer, TSAP, which is a pointer to the string of TSAs containing context saved by traps running at the level of its associated interrupt save area. As indicated in pending application Ser. No. 591,906, filed on June 30, 1975, the interrupt save area 204 includes other contexts, such as channel and level number of the interrupting device and locations to store the contents of for example the program counter 20, and other registers such as the data and base registers. A mask may also be stored in the interrupt save area which mask is utilized for example for determining which ones of the various registers in the processor are to have their contents saved. Thus, the mask is used for saving the contents of various registers depending upon the level number. The context saved in response to an interrupt must be complete enough so that the interrupted process context may be returned following the execution of a new, interrupting process.

Associated with the ISA's 204 are interrupt vectors 212 which by way of example are also 64 in number. The current interrupt level causes an address to be formed to point to the interrupt vector associated with such current level. In the example shown in FIG. 6, interrupt vector 30 is shown to be the current interrupt vector. The manner in which such current IV level address is generated is shown in pending application Ser. No. 591,905, filed on June 30, 1975. It should be noted however that the manner in which such address is generated is not pertinent to the subject invention and that other such address forming techniques may have been utilized.

The fourth element in the trap structure is a set of trap vectors 206, each of which includes a starting address of a different procedure, each of which procedures will handle conditions occasioned by different traps. Such procedures are not process or computer program dependent, but rather are trap class specific. That is, all processes, at whatever interrupt level, use the same set of trap handler procedures, and each class of traps will invoke a different procedure. As just indicated, there are various trap classes which by way of example may be nine in number. Thus, each trap vector 206 may include starting addresses in a table which is comprised of the starting addresses for the following trap handler procedures: a so-called monitor call instruction, a so-called trace instruction, a floating point operation code, an undefined operation code, overflow condition, an unprivileged use of a privileged instruction, a missing resource, a program logic error, and a parity error, It should be understood that there may be other trap handler procedures which may be added as required.

FIG. 6 illustrates a typical block diagram of the trap structure of the present invention. The pool 210 of trap save areas 200 are shown by way of example to include N through N+X trap save areas. NATSAP 202 points to TSAN (200−N) and the TSAP in TSAN points to TSAN+1 and so on. The next trap that occurs will in fact unlink TSAN from the pool 210 in order to associate or couple the various context saved with the interrupt level of the current process. Following such unlinking, NATSAP will point to TSAN+1. The TSAP in TSAN will then either point to zero if there were no previous trap save areas associated with the current level interrupt save area, or will point to the trap save area which had previously been pointed to by the TSAP in the current ISA 204. It is thus noted that the newly acquired TSA 200 from the pool 210 will be inserted between such ISA and an TSAs which may have been coupled thereto.

Each of the interrupt vectors may be associated with an interrupt save area 204. Thus, IV0 is associated with ISA0 and IV30 is associated with ISA30. By way of example, the first location in an interrupt save area includes a trap save area pointer (TSAP) which may point to the last trap save area used with such interrupt level. If no trap save areas are currently being utilized by an interrupt save area, then the TSAP will point to zero. There may be more than one trap save area associated with an interrupt save area. For example, it was noted that interrupt vector 30 points to ISA30 which in turn points to three trap save areas. Thus, the TSAP in ISA 30 points to TSA2 and the TSAP in TSA2 points to TSA3 and so on.

More than one trap save area may be required since in fact traps may occur even in response to the execution of the trap handler routine. Thus, for example, assume that the process operating at interrupt level 30 and assume there is an opcode instruction detected for which certain elements necessary to carry out such instruction are not implemented in the system. For example, assume that the opcode requires a special arithmetic unit and such unit is not included in the system. In such case, a trap condition will occur and the context will be stored in the appropriate trap save area from the pool 210 and the trap vector for that type of trap will be addressed, which in turn will address a trap handler procedure which is implemented to emulate such special arithmetic unit with the basic capabilities, i.e., by means of a computer program(s) which may be included in the processor as shown in FIG. 2. Thus, the process at level 30 will continue to execute by use of the trap handler procedure for such uncoupled special arithmetic unit. Suppose that during such emulation with such trap handler procedure that for example a parity error is detected. In such case, another trap condition will be detected, and another trap save area will be linked with ISA30 for storage of the context at which point the trap handler procedure for such condition will be called on to handle such parity error condition. Following handling of such parity error condition, the trap save area which is used to handle such parity error will be returned to the pool 210 of trap save areas. The original trap save area for the emulated special arithmetic unit may be returned to thereafter.

As generally noted hereinbefore, once context of the various registers, etc., is stored in the trap save area, it is then necessary to identify the location of the trap handler procedure which is to handle the trap, following which it is necessary to unlink the trap save area which was used to store such context in response to a trap condition and which is still linked in the pool 210. Following this it is necessary to link such trap save area to the interrupt save area to which it is now being assigned. After the trap save area has served its purpose, it is then necessary to reverse the above and place such trap save area in the pool 210. Thus, once the context is saved in the trap save area, a trap vector address based upon the trap number is utilized to address one of the trap vectors 206. As previously discussed, there are a plurality of trap vectors, each pointing to different trap handling procedures which are used for handling different type traps regardless of the interrupt level. That is, a process running at interrupt level 15 may use the same trap handling procedure as a process running at level IVO or IV63, for example, the trap number utilized to address one of the trap vectors 206 is dervied from the nature of the trap. Thus, for example, if parity error exists, then this will be detected and will generate a bit code related to the trap number. The manner in which such trap number may be generated and thereby address the trap vectors may be similar to that utilized in forming a bit code to address the interrupt vectors. Specific implementation of such vector address generation is not pertinent to the present invention, it being pertinent only that a different trap number is received for a different trap condition. Following the addressing of one of the trap vectors, such trap vector in turn includes the address of its associated trap handler procedure 214 which is then addressed. As discussed hereinbefore, such procedure is executed following which such procedure is exited and the associated trap area is returned to the pool 200 of trap save areas 200.

Figure 7:
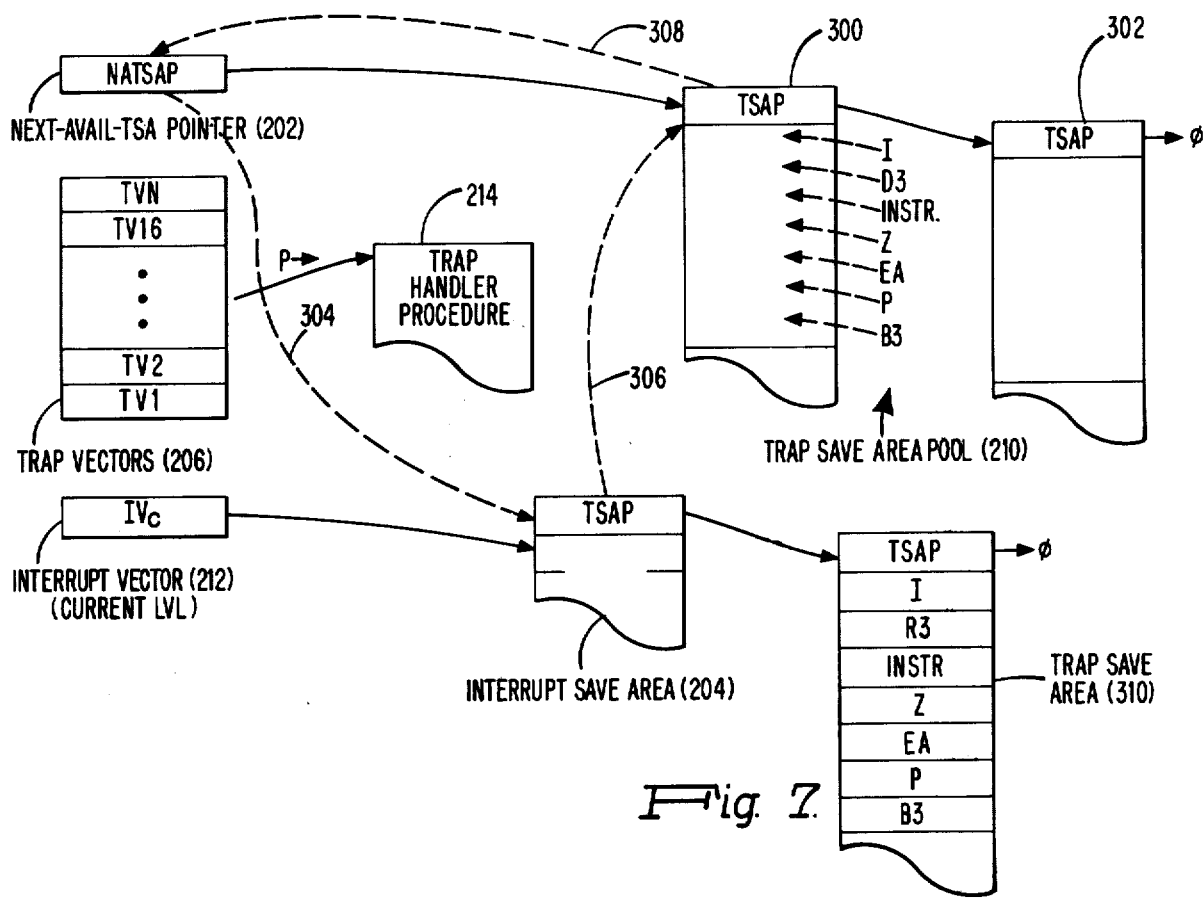
FIG. 7 is a block diagram illustrating the manner in which the system of the present invention responds to a so-called trap condition.
Figure 8:
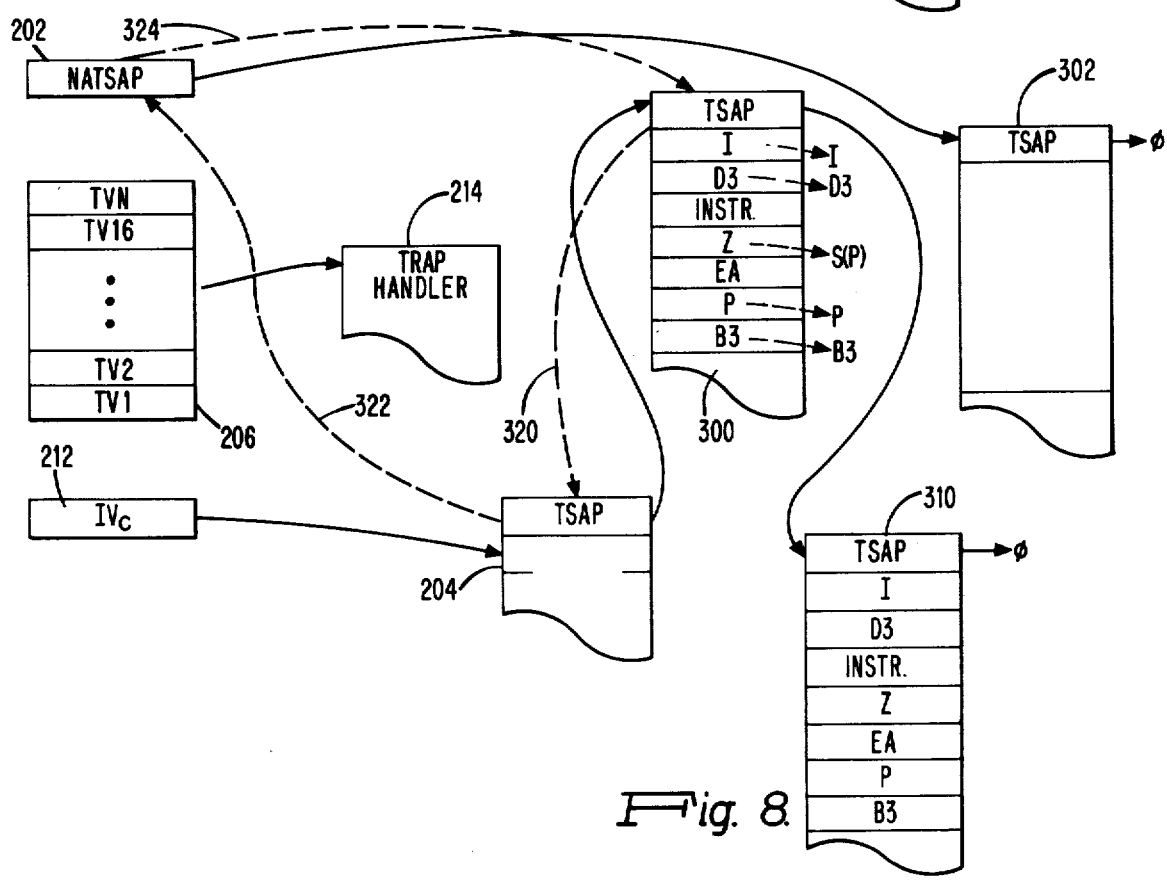
FIG. 8 is a block diagram illustrating the manner in which the system of the present invention exits from a so-called trap condition.

Now with reference to FIG. 7, the sequence of operations which occurs in response to a detection of a trap condition shall be explained. Save area 200 (300 in FIG. 7) pointed to by the next available trap save area pointer 202 is loaded with the context associated with the trap. For purposes of convenience, this trap save area pointed to by NAPSAP 202 is numbered element 300. Also for the purpose of simplicity of illustration, only two trap save ares 300 and 302 are shown in the trap save area pool 210. Thus, the context of the various elements are stored in TSA300. In succession, the context of the I. D3 and F registers, the status information (Z input), the effective address (EA), program counter, and the base register, B3, are written into the locations indicated. Then this trap save area 300 is unlinked from the pool 210, and linked into the head of the string of context save areas attached to the interrupt context save area of the current process interrupt level. This is accomplished by a triangular rotate of addresses indicated by the dashed lines 304, 306 and 308. The trap save area pointer for TSA300 will replace the pointer NATSAO 202, which in turn replaces the TSAP in the interrupt save area 204, which is the interrupt save area pointed to by interrupt vector 212 of the current level. The TSAP in the ISA204 replaces the TSAP in TSA300. Following this rotation of addresses, the trap number which is provided in response to a detection of the nature of the trapped condition is used to address the appropriate trap vector 206. The selected trap vector is then loaded into the program counter 20 to point to the beginning of the trap handler procedure 214. The result is thus that the trap save area 300 is coupled between ISA204 and TSA310, which was previously coupled to ISA204 by its TSAP. Such resultant configuration from the trap save area and links or pointers, upon completion of the trap is shown by the solid lines in FIG. 8. FIG. 8 also shows the manner in which the trap save area is returned to the trap save area pool 210.

Note that at the time of a trap condition, the trap save area used becomes part of the current process context, and if this process has been interrupted while servicing the trap, the trap save area remains linked to this interrupt context save area until this process is resumed, at which time a trap will be processed to completion, after which the trap save area will be finally released.

Thus, with reference to FIG. 8, upon completion of the trap routine, NATSAP 202 will point to TSA302. The interrupt vector 212 will continue to point to interrupt save area 204, but the TSAP thereof will point to TSA300 whose TSAP will in turn point to TSA310. Thus, TSA300 has been coupled between ISA204 and TSA310. The TSAP of TSA310, as well as that of TSA302, will continue to point to zero which indicates that there are no additional trap save areas. With respect to TSA310, this means that no further trap save areas are associated with this interrupt level and with respect to TSA302 this means that there are not further TSAs 200 in the pool 210 of TSAs. Such condition will be detected and at that point a procedure may be entered by which further TSAs may be formed for replacement in the pool of trap save area for future use by the system of the present invention.

Upon completion of the trap, i.e., when the trap handler procedure is ready to return to the procedure running at the time of the detection of such trap, in response to the execution of an instruction, a signal will be enabled which has the effect of reloading part of the saved context and then unlinking that trap save area from the process context and returning it to the pool 210 of available trap save areas. Initially, on a return from trap operation, the indicated elements, i.e., the I, D3, S(P), P and B3 registers are reloaded from the indicated locations in the trap save area 300 into the elements indicated, the S(P) indication indicating the various status registers which may be included in the system for example in hardware control 54 of FIG. 2. The unlinking of the trap save area and its return to the pool 210 is then performed by the triangular rotate of addresses as indicated by the dashed lines 320, 322 and 324 in FIG. 8. Thus, the TSAP (i.e., to TSA310) of TSA300 replaces the TSAP in interrupt save area 204, following which the TSAP thereof (i.e., to TSA300) replaces the NATSAP 202 which in turn replaces the original TSAP of TSA300. Thus, the configuration after the return from the trap condition is the same as that which existed prior to the trap entry.

Figure 9:
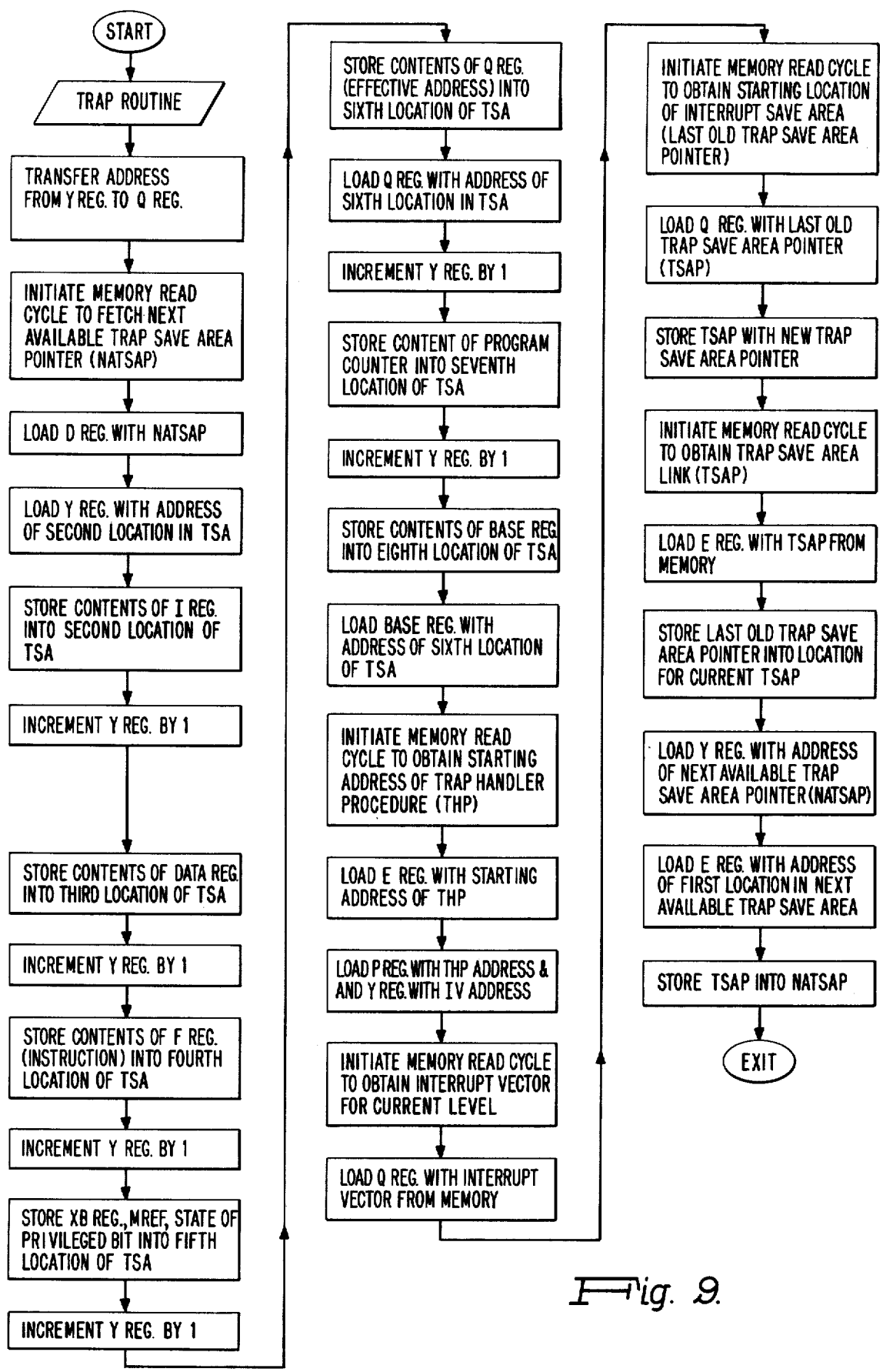
FIG. 9 is a flow diagram illustrating the firmware utilized in such control store for purposes of the present invention.

The manner in which the control words in control store 10 are provided to implement the trap mechanism of the present invention in response to a trap condition is shown by the flow diagram of FIG. 9. Such flow diagram represents the firmware control store words which are used in saving context and which are used in unlinking a trap save area from the pool 210 of trap save areas 200. A return of a trap save area to the pool would be accomplished in a similar manner, essentially the reverse of that shown in FIG. 9. Mechanisms by which various pointers may be interchanged or updated may be shown by way of example in the apparatus illustrated in U.S. Pat. Nos. 3,546,677, issued Dec. 8, 1970; 3,678,461, issued July 18, 1972; and 3,614,746, issued Oct. 19, 1971. With further reference to FIG. 9, it can be seen that various registers in the processor 13 may be used including the Y register 22, the Q register included in the RALU 12, the D register also included in the RALU 12, and the F register 36. Upon saving of such context in the various locations in the trap save area which was pointed to by the next available trap save area pointer 202, once the starting address of the trap handler procedure is acquired and loaded into the E register in the RALU 12, and the interrupt vector for the current level is obtained, the swapping of pointers in the triangular rotation indicated in FIG. 7 is begun. Upon completion of the trap handler procedure, after the use of the context in the trap save area has been completed, such trap save area is returned to the pool 210 of trap save areas. Thus, the return from trap condition is completed.

Although one example of the present invention has been shown by way of illustration, it should be understood that there are many other rearrangements and embodiments of the present invention within the scope of the following claims.

Having described the invention, what is claimed as new and novel and for which it is desired to secure Letters Patent is:

1. A trap mechanism in a data processing system which includes a central processing device, a memory device and a plurality of data processing devices, each of said devices coupled to a system bus for the transfer of data thereover, each of said devices having an interrupt level associated therewith, said interrupt levels indicating priorities for gaining access to said system bus, an interrupt level of a first priority will have precedence to said system bus over a said device having an interrupt level of a second priority, said mechanism further comprising:
   A. a plurality of trap save areas, in said memory device each of said areas including a plurality of locations for storing information;
   B. first means for linking said plurality of trap save areas with each other to form a pool of said trap save areas, said means for linking including pointer means in each of said areas for pointing to another of said areas so that a first said area points to a second said area and so that second said area points to a third said area until a next to last said area points to a last said area;
   C. means for indicating the interrupt level specified by one of said devices which requires the processing of data and which requires the execution of a process in said system;
   D. means, responsive to a predetermined condition in said system, for loading said locations in one of said areas with information from predetermined sources in said system;
   E. means, responsive to said predetermined condition, for unlinking said one of said areas from said pool of said areas; and
   F. second means, responsive to said predetermined condition, for linking said linked said one of said areas with said process associated with the device having the interrupt level indicated by said means for indicating.

2. A system as in claim 1 wherein said one of said areas is said first said area.

3. A system as in claim 2 further comprising:
   A. means for pointing to said first said area in said pool of said trap save areas; and wherein
   B. said second means for linking includes said means for pointing.

4. A system as in claim 1 further comprising a plurality of interrupt save areas, one associated with each said interrupt level, for storing information required for use in response to an interrupt received from a said device, said information including a location for a pointer to a said trap save area.

5. A system as in claim 4 wherein said pointer is equal to a predetermined number if none of said trap save areas are coupled with the interrupt save area having said pointer.

6. A system as in claim 5 wherein said predetermined number is zero.

7. A system as in claim 4 wherein said pointer includes an address to another one of said trap save areas.

8. A system as in claim 7 wherein said pointer means in said another one of said trap save areas includes an address to a further one of said trap save areas.

9. A system as in claim 1 further comprising:
   A. a plurality of trap handling procedures, each of said procedures useable for servicing a predetermined type of said predetermined condition; and
   B. means, responsive to a first said type of said predetermined condition, for enabling the operation of an associated one of said procedures independent of the interrupt level associated with said process at the time of the occurrence of said predetermined condition.

10. A system as in claim 1 wherein said predetermined sources include a plurality of registers in said system for storing information relative to the addressed location in a memory coupled with said system, status indicators, instruction and data transfer information.

11. A system as in claim 1 further comprising:
   A. means, responsive to said predetermined condition, for executing the operation required by said condition;
   B. means for receiving a return from trap signal upon completion of said operation provided by said means for executing; and
   C. means, responsive to said return from trap signal, for
      1. unlinking said one of said areas from said process, and
      2. relinking said unlinked said one of said areas back into said pool of said areas.

12. A system as in claim 11 further comprising means, responsive to said return from trap signal, for returning said information from said locations in said one of said areas back to said predetermined sources.

13. A system as in claim 1 wherein said one of said trap save areas is said first said trap save area and wherein said system further comprises:
   A. means having contents for pointing to said first said area in said pool of said trap save areas;
   B. a plurality of interrupt save areas, one associated with each said interrupt level, for storing information required for use in response to an interrupt received from a said device, said information including a location for a pointer to a said trap save area; and wherein
   C. said means for unlinking and said second means for linking include
      1. means for transferring said contents of said means for pointing to said location for a said pointer in the one of said interrupt save areas whose associated interrupt level had precedence at the time of the occurrence of said predetermined condition,
      2. means for transferring said pointer means in said first said trap save area to said means for pointing,
      3. means for transferring a predetermined number into said pointer means of said first said trap save area if there are no other trap save areas coupled with said one of said interrupt save areas, and
      4. means for transferring an address of a trap save area coupled with said one of said interrupt save areas into the pointer means of said first said area.

* * * * *